(No Model.)
L. ABBOTT.
FRUIT PICKER.
No. 515,702. Patented Feb. 27, 1894.
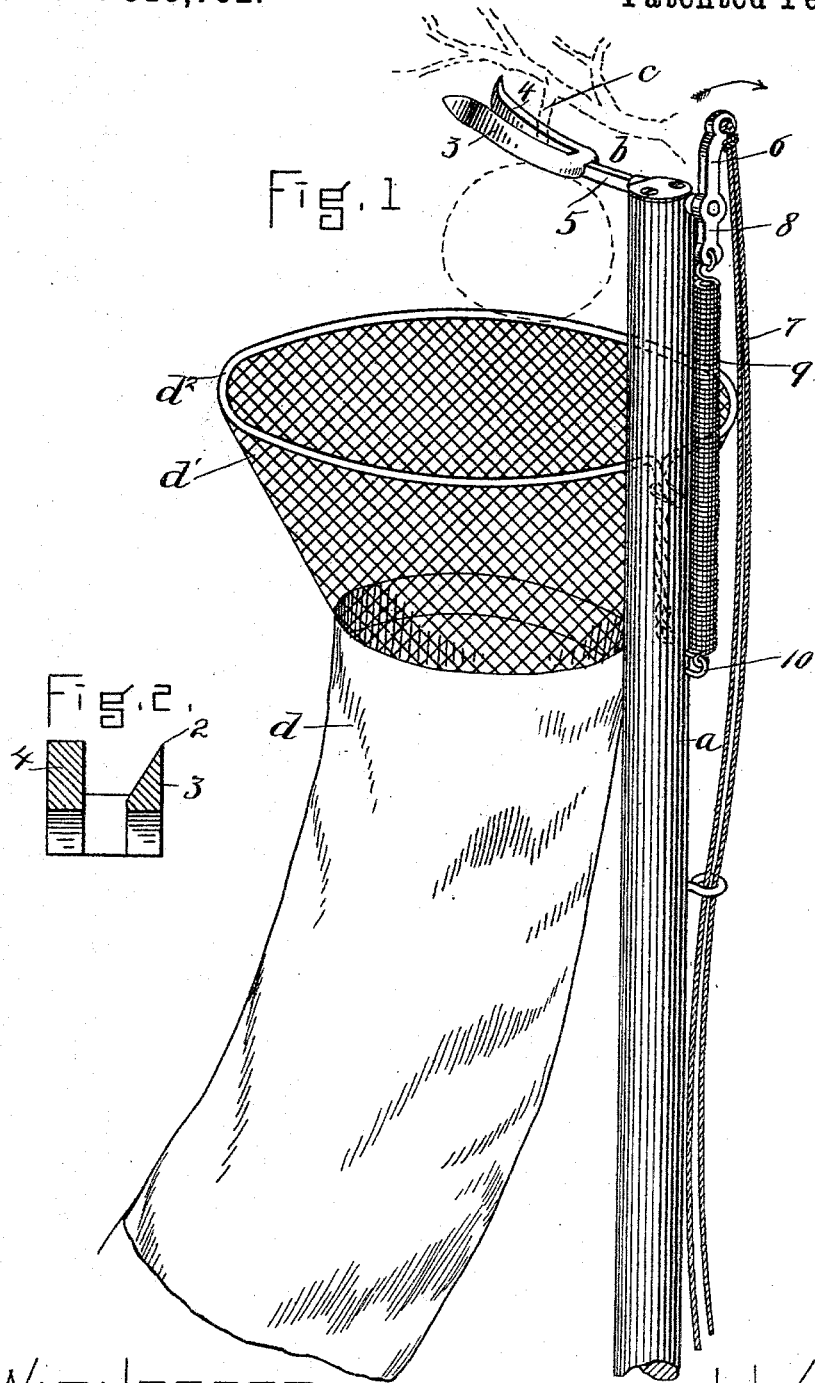
Witnesses.
F. M. Whipple
A. D. Harrison
Inventor.
Levi Abbott
by Wight Brown Crossley
Attys.

United States Patent Office.

LEVI ABBOTT, OF ARLINGTON, ASSIGNOR OF ONE-FOURTH TO D. HENRY MORRISON, OF SOMERVILLE, MASSACHUSETTS.

FRUIT-PICKER.

SPECIFICATION forming part of Letters Patent No. 515,702, dated February 27, 1894.

Application filed May 22, 1893. Serial No. 475,027. (No model.)

*To all whom it may concern:*

Be it known that I, LEVI ABBOTT, of Arlington, in the county of Middlesex and State of Massachusetts, have invented certain new and useful Improvements in Fruit-Pickers, of which the following is a specification.

This invention relates to that class of fruit picking devices employing a rod or pole having at one end means for engaging and breaking or severing the stem of the fruit, and causing the same to drop through into a chute affixed to the pole.

The invention has for its object to provide a device for engaging and severing the stem, which shall be more simple and effective than the devices heretofore used.

For this purpose and to this end the invention consists as a whole in a fruit picker, comprising a rod or handle, a fork journaled in a bearing at one end of the handle, said fork being formed to receive between its arms a fruit stem, and suitable means, such as an arm affixed to the shank of the fork, and a cord extending around the rod, whereby the operator may partially rotate the fork after its engagement with the fruit stem, and thereby sever or break said stem.

The invention also consists in certain other improvements, all of which I will now proceed to describe and claim.

Of the accompanying drawings forming a part of this specification—Figure 1 represents a perspective view of my improved fruit picker. Fig. 2 represents an enlarged transverse section through the arms or prongs of the fork.

The same letters and numerals of reference indicate the same parts in all the figures.

Of the drawings—$a$ represents the rod or handle of the fruit picker, and $b$ represents the fork which is composed of the prongs 3 4, and the shank 5, to which said prongs are secured. The shank is journaled in a suitable bearing formed for its reception in a rod, and at or near one end of the latter, and is provided at one end with an arm 6 to which is connected a cord 7, and another arm 8 to which is connected a spring 9, said spring being also connected by a staple 10, or otherwise with the rod $a$. The spring 9 and arm 8 are arranged so that the tension of the spring normally holds the fork in the position shown in Fig. 1, so that the operator holding one end of the rod or handle can conveniently engage the fork with a stem $c$ by moving the fork upon the stem, the outer ends of the prongs of the fork being preferably flared or curved outwardly, as shown in Fig. 1. It will be seen that when the fork is engaged with a stem as above described, the stem may be readily broken or severed by giving the fork a partial rotation, this being accomplished by pulling the cord. The rotary movement of the fork cuts or breaks the stem, leaving the part of the latter that is connected with the fruit engaged with the prongs, so that the fruit is supported by the fork until the cord 7 is released, whereupon the prongs will release the stem, and the fruit will drop into a suitable receptacle or chute $d$ attached to the rod $a$. I prefer to provide the prong 3 with a cutting edge 2 as shown in Fig. 2, to enable the rotation of the fork to the more readily sever the stem. I do not limit myself to this form however, and may make the prongs of any suitable shape.

I do not limit myself to the particular means here shown for turning the fork, and for normally holding it in position to engage the stem, and may use any other suitable means adapted to accomplish the said results, without departing from the spirit of my invention.

I prefer to provide the chute $d$ with a wire work mouth $d'$, having in its upper end a wire rim or margin $d^2$, which is or may be suitably affixed to the rod $a$. Said mouth is preferably made tapering as shown in Fig. 1, and is substantially made with this construction to enable the operator to see the fruit through it, so that when in use the mouth $d'$ is held in such position that it will be sure to catch the fruit when it drops and the operator is enabled to see the fruit with sufficient clearness to enable him to engage the fork with the stem thereof.

I claim—

1. The improved fruit picker hereinbefore described, the same comprising the handle, the fork journaled in a bearing on the handle, and means for rotating said fork, as set forth.

2. In a fruit picker the combination of the handle, the fork journaled in the handle, a spring whereby the fork is normally held in its fruit engaging position, and means for turning the fork from said position, as set forth.

3. In a fruit picker the combination of the handle, the fork journaled in the handle, a spring whereby the fork is normally held in its fruit engaging position, arms affixed to the shank of said fork, a spring engaged with one of said arms and an operating cord secured to the other arm, as set forth.

4. In a fruit picker, the combination with the rod and the fork rotatively engaged therewith, of the chute having a mouth constructed to permit the fork to be seen through the mouth, as set forth.

In testimony whereof I have signed my name to this specification, in the presence of two subscribing witnesses, this 27th day of March, A.D. 1893.

LEVI ABBOTT.

Witnesses:
C. E. BROWN,
ARTHUR W. CROSSLEY.